United States Patent [19]

Landry

[11] Patent Number: 5,401,091

[45] Date of Patent: Mar. 28, 1995

[54] MOLDED BUMPER RAIL FOR A PORTABLE COMPUTER

[76] Inventor: Christian C. Landry, 224 Old Littleton Rd., Harvard, Mass. 01451

[21] Appl. No.: 103,509

[22] Filed: Aug. 6, 1993

[51] Int. Cl.6 .............................................. A47B 81/00
[52] U.S. Cl. .................................. 312/223.1; 220/732; 248/345.1
[58] Field of Search .................. 312/223.1, 223.2, 296, 312/208.4; 220/732; 361/679, 680, 681, 683, 724; 206/305, 320; 364/708.1; 248/345.1, 615

[56] References Cited

U.S. PATENT DOCUMENTS

| | | | |
|---|---|---|---|
| 1,915,249 | 6/1933 | Jorgensen | 248/345.1 |
| 2,210,183 | 8/1940 | Schweighart | 220/732 |
| 3,809,311 | 5/1974 | Fohrman et al. | 248/345.1 |
| 4,456,315 | 1/1984 | Markley et al. | 220/732 |
| 4,839,837 | 6/1989 | Chang | 361/681 |
| 5,002,184 | 3/1991 | Lloyd | 206/305 |
| 5,134,245 | 7/1992 | Katz | 361/683 |
| 5,323,899 | 6/1994 | Strom et al. | 206/305 |

FOREIGN PATENT DOCUMENTS 508033  10/1992  European Pat. Off. ............ 361/679

*Primary Examiner*—Kenneth J. Dorner
*Assistant Examiner*—Janet M. Wilkens
*Attorney, Agent, or Firm*—Arthur W. Fisher; Ronald C. Hudgens; Mary M. Steubing

[57] ABSTRACT

A portable computer enclosure with a bumper rail on the sidewalls, the rail being of such width in relation to the height of the sidewalls and being of such height above the surface of the sidewalls that the rail is effective to provide bump protection to the sidewall. The portable computer enclosure with the bumper rail is built to withstand bumping and accidental latch releases, thereby protecting the computer.

13 Claims, 6 Drawing Sheets

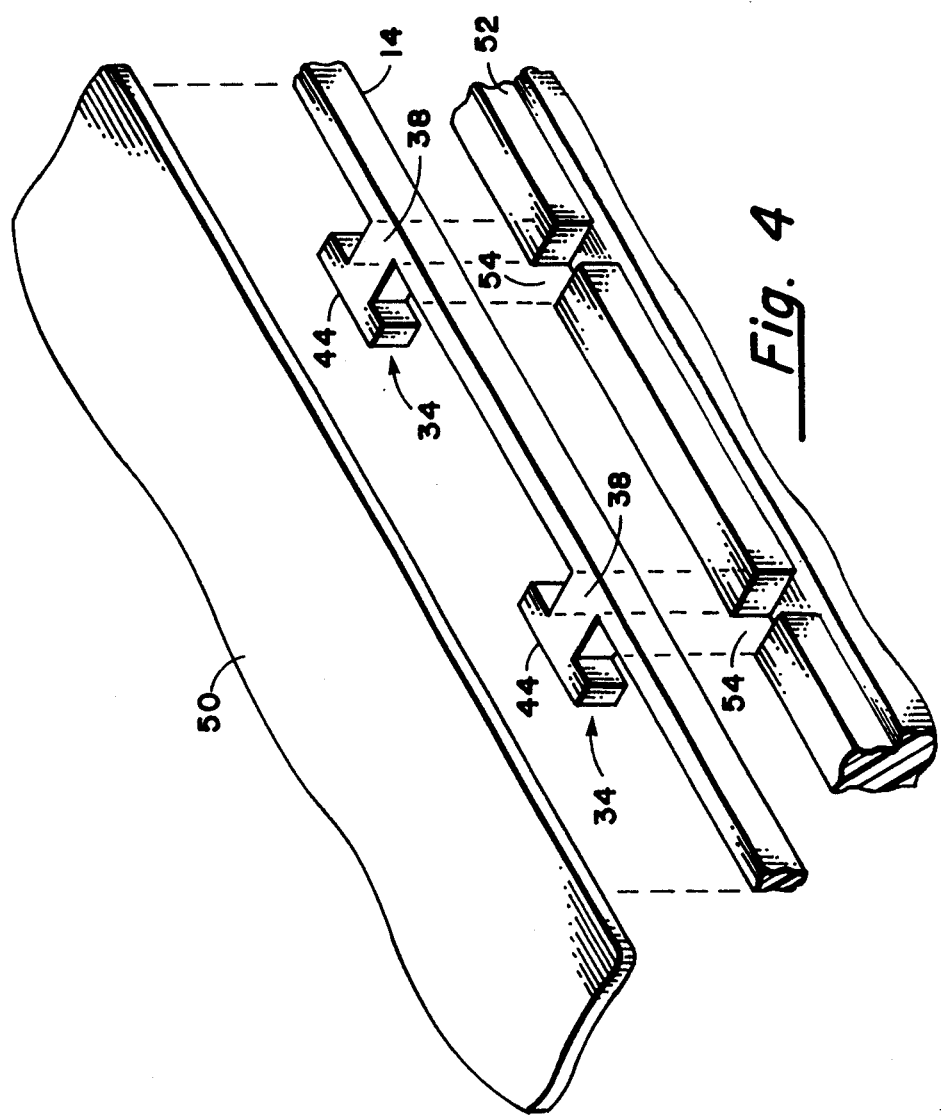
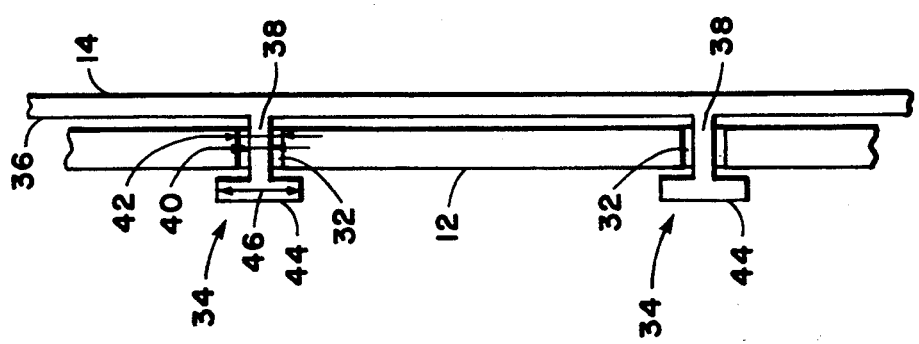

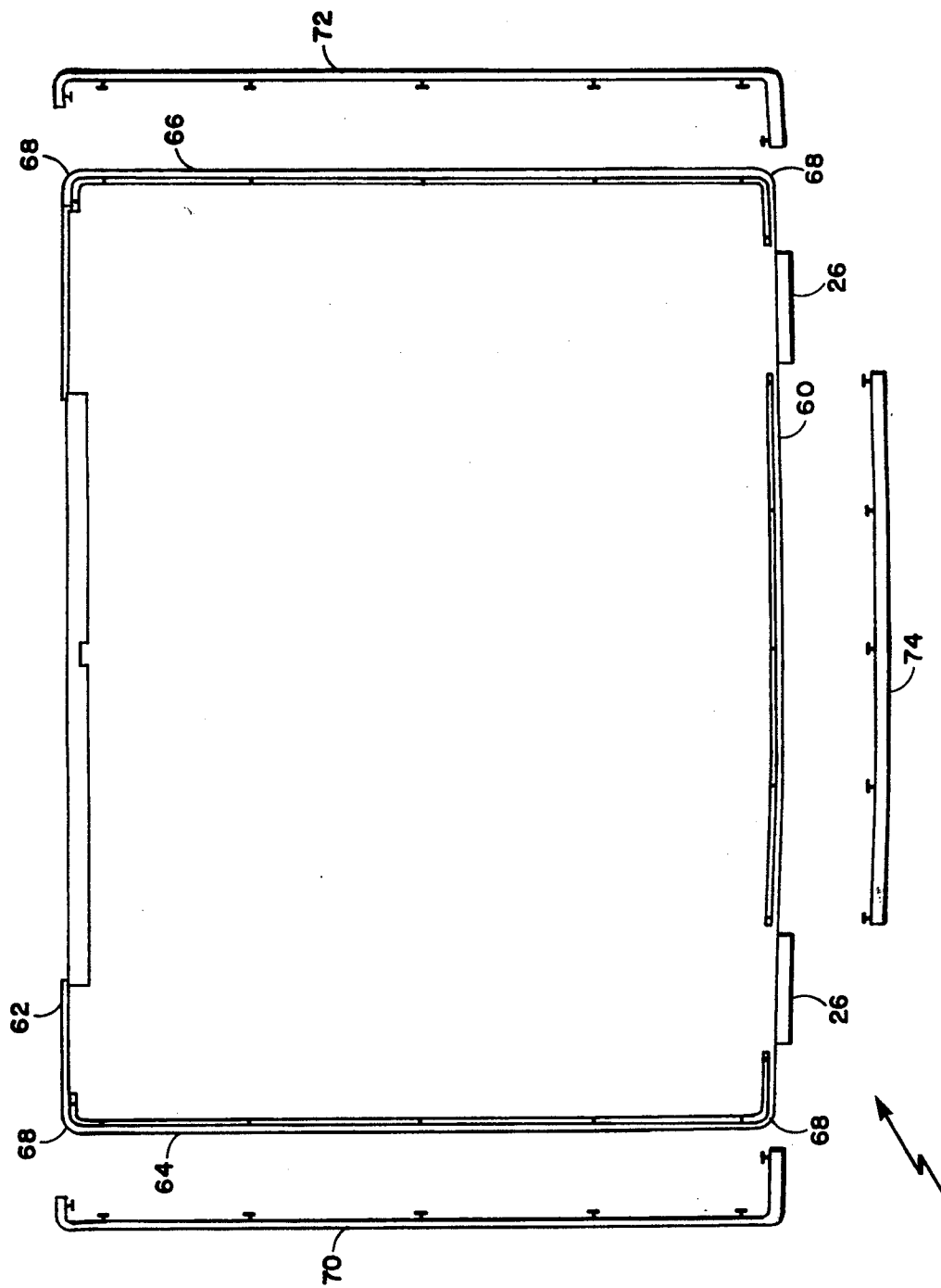

MOLDED BUMPER RAIL FOR A PORTABLE COMPUTER

BACKGROUND OF THE INVENTION

The invention relates to portable computer enclosures and particularly to protective bumper rails for portable computer enclosures.

Portable computers are subject to more movement, knocking, and dropping than other types of computers due to their portability. Some portable computers are designed to be transported in carrying cases to protect them during movement. However, the computer is still subject to knocking and dropping when it is removed from the case and even when it is in use.

A more particular problem arises for portable computers that have latches extending from their enclosures for opening and closing the computer. Accidental contact between the latches and a surface can accidentally release the latches, causing the computer enclosure to open and thus subjecting the computer to damage.

There is therefore a need for a portable computer enclosure that is built to withstand such treatment without adding significantly to the cost of the computer. In particular, there is a need to protect the latching mechanism of the computer against accidental release.

SUMMARY OF THE INVENTION

In accordance with the present invention, there is provided a portable computer enclosure comprising a sidewall and a bumper rail on the sidewall, the rail being of such width in relation to the height of the sidewall and being of such height above the surface of the sidewall that the rail is effective to provide bump protection to the sidewall.

According to a further aspect of the invention the sidewall is a front wall and the computer enclosure further comprises latches extending from the front wall for opening and closing the computer, and the bumper rail extending from the front wall to a distance greater than or equal to the distance to which the latches extend, thus protecting the latches from being accidentally released.

According to a more specific aspect of the invention, the sidewall further comprises a plurality of spaced apart slots and the bumper rail further comprises a plurality of fastening protrusions extending from a surface of the rail and spaced apart for fastening cooperation with the slots, the fastening protrusions comprising a lengthwise section of a dimension smaller than the width of a slot for extension through the slot and a lengthwise section spaced from the surface of the rail and being of a dimension larger than the width of a slot for fastening the rail to the sidewall when the protrusion is in rail fastening position in the slot. In particular, the protrusions may be T shaped or arrow shaped.

According to another aspect of the invention, a portable computer enclosure comprises a front wall, a back wall, a left sidewall, and a right sidewall all interconnected by corners, the front wall further comprising latches for opening and closing the computer, the enclosure also comprising a bumper rail comprising a first section fitting the contours of the left sidewall and extending around the corners to the back wall and the front wall, a second section fitting the contours of the right sidewall and extending around the corners to the back wall and the front wall, and a third section fitting between the latches.

With this arrangement there is provided a portable computer enclosure built to withstand bumping and accidental latch releases thereby protecting the computer.

BRIEF DESCRIPTION OF THE DRAWINGS

FIG. 3 is a cross-sectional view of the bumper rail showing fastening protrusions for fastening the bumper rail to a sidewall of the computer;

FIG. 4 is a perspective view of the sidewall and bumper rail assembly;

FIG. 6 is a top view of the portable computer and the bumper rail, showing a bumper rail including three sections.

DETAILED DESCRIPTION OF THE PREFERRED EMBODIMENT

Figure 1:
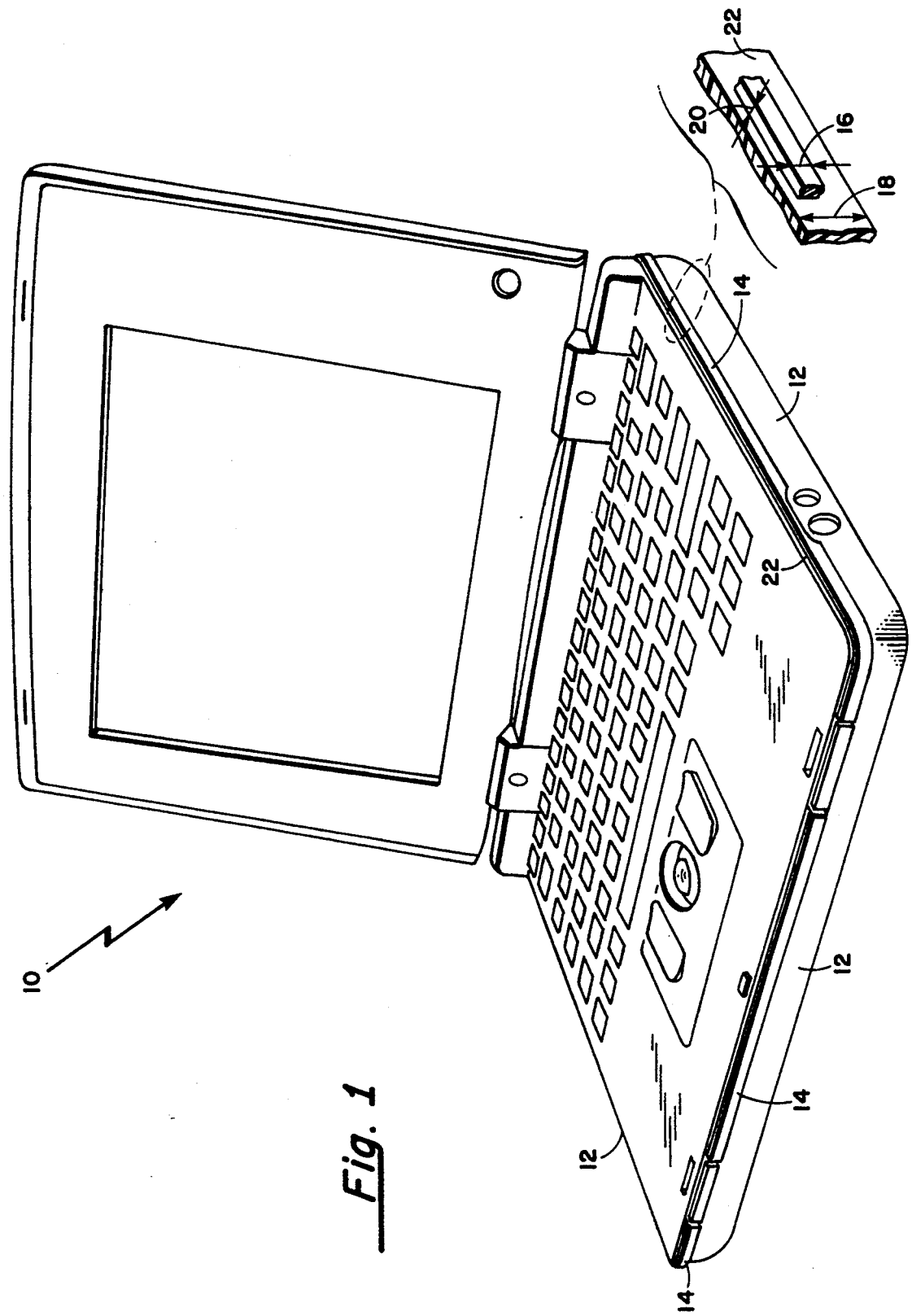
FIG. 1 is a perspective view of a portable computer including a bumper rail according to the principles of the invention.

In FIG. 1 there is shown a portable computer 10 including sidewalls 12. On each sidewall 12 is a bumper rail 14. The bumper rail 14 is of such width 16 in relation to the height 18 of the sidewall 12 and of such height 20 above the surface 22 of the sidewall 12 to be effective to provide bump protection to the portable computer 10 in the event that any of the sidewalls are bumped or knocked against a surface. It has been found effective to provide a bumper rail 14 with a height 16 of approximately 1/6 the height 18 of the sidewall 12, and with a width 20 approximately 1.6 mm above the surface 22 of the sidewall 12. Thus, in the embodiment shown, the sidewall 12 has a height 18 of 33.5 mm, and the bumper rail 14 on the sidewall 12 has a height 16 of 5.33 mm and a width 20 of 1.6 mm above the surface 22. Here the bumper rail 14 is shown to have a rectangularly shaped profile, though a rounded profile with a radius of approximately 1.6 mm would also be functional.

Figure 2:
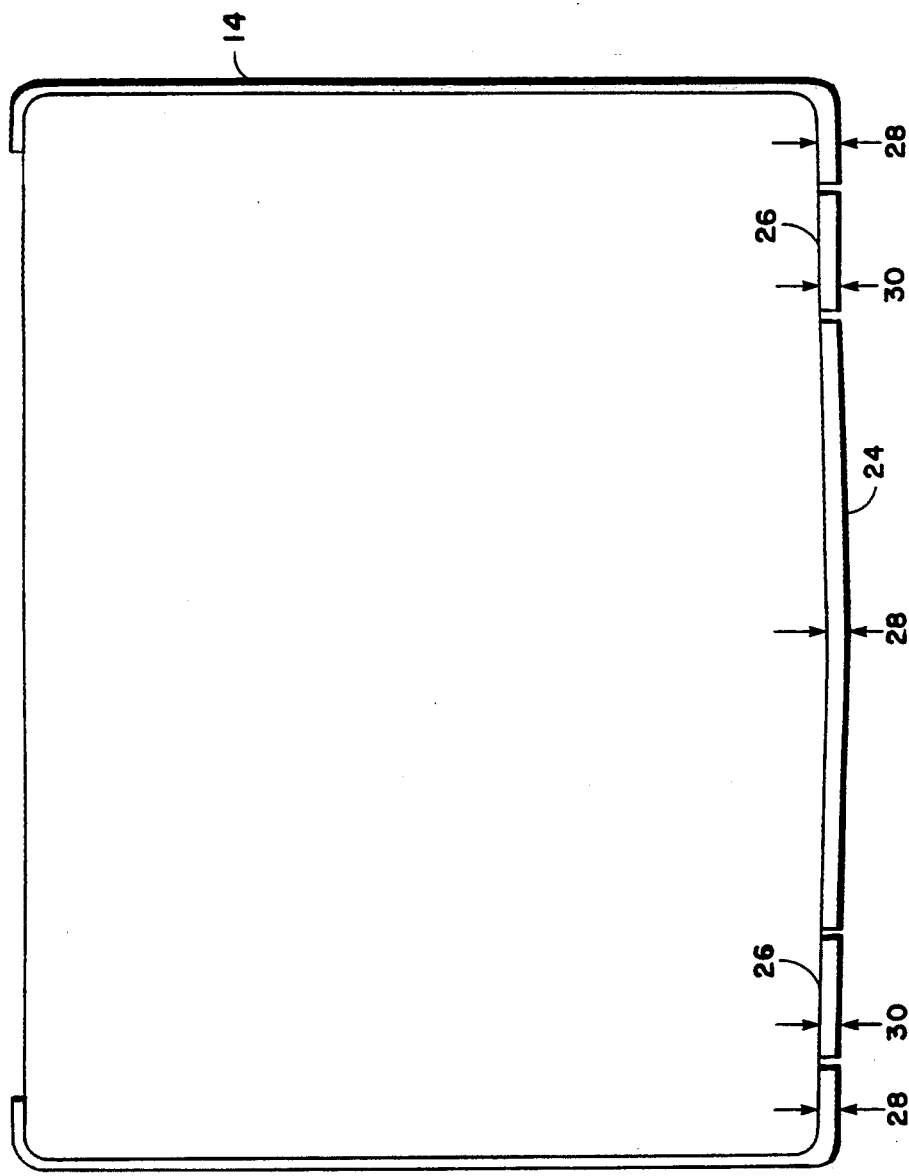
FIG. 2 is a top view of the portable computer of FIG. 1 showing the latches for opening and closing the computer.

Referring now to FIG. 2, there is shown a top view of the computer 10. A front wall 24 includes latches 26 extending therefrom for opening and closing the computer 10. The bumper rail 14 extends from the front wall 24 to a distance 28 greater than or equal to the distance 30 to which the latches 26 extend, thus protecting the latches 26 from being accidentally released when the front wall 24 is bumped or knocked against a surface. It the preferred embodiment, the bumper rail 14 extends from the front wall 24 to approximately the same distance to which the latches 26 extend; that is, approximately 2.61 mm. Thus, in the preferred embodiment, the section of the bumper rail 14 extending from the front wall 24 has a greater width 20 than the section of the bumper rail 14 extending from the sidewall 12. Alternately, a bumper rail 14 of a uniform width sufficient to protect the latches 26 can be provided.

Referring now to FIG. 3, there is shown a detailed view of the bumper rail 14 as it is attached to a sidewall 12. The sidewall 12 is shown to include spaced apart slots 32, and the bumper rail 14 is shown to include fastening protrusions 34 extending from a surface 36 of the bumper rail 14 and spaced apart for fastening cooperation with the slots 32. The fastening protrusions 34 have a narrow lengthwise section 38 of a dimension 40 smaller than the width 42 of the slot 32, and a wider lengthwise section 44 spaced from the surface 36 of a dimension 46 larger than the width 42 of the slot 32. The lengthwise section 44 serves to fasten the rail to the sidewall when the protrusion is in rail fastening position in the slot.

For example, as shown in FIG. 3, the fastening protrusion 34 is T-shaped, the stem 38 of the T extending through the slot 32 and the crossbar 44 acting to fasten the rail 14 to the sidewall 12. Such a fastening protrusion 34 would operate as shown in FIG. 4, where the sidewall 12 is assembled of upper and lower parts 50 and 52. The lower part 52 includes slots 54. During assembly, the bumper rail 14 is placed such that the stems 38 of the T-shaped protrusions 34 lie in the slots of the lower part 50. When the upper and lower parts 50 and 52 are attached, the crossbar 44 of the protrusion 34 fastens the bumper rail 14 to the sidewall 12.

Figure 5B:
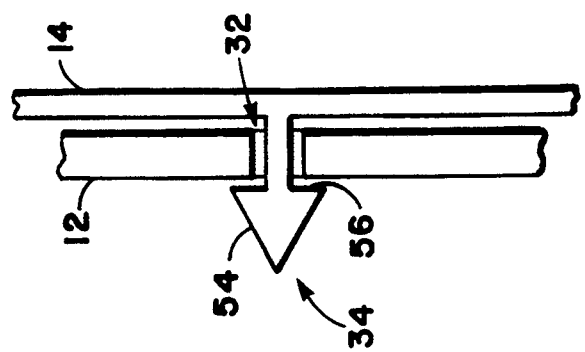
FIG. 5(b) is another alternate embodiment of the fastening protrusion of FIG. 3.
Figure 5A:
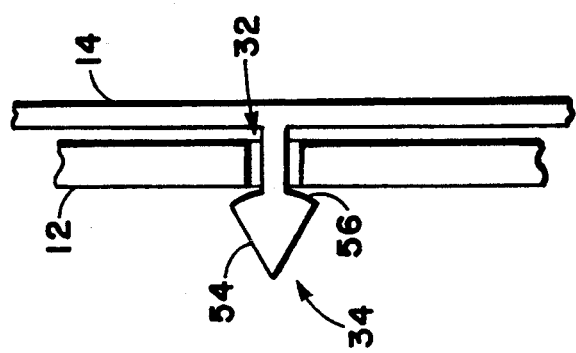
FIG. 5(a) is an alternate embodiment of the fastening protrusion of FIG. 3.

Alternately, the fastening protrusion 34 may be arrow-shaped as shown in FIGS. 5(a) and 5(b). The head 54 of the arrow-shaped protrusion 34 has a narrow tip, and extends to a round base (FIG. 5(a)) or flat base (FIG. 5(b)) 56 which is wider than the slots 32 in the sidewall 12. When manufactured of a compressable material, the narrow tip of the head 54 of the protrusion 34 allows installation by pushing the protrusion 34 through the slot 32. The expansion of the wide base 56 upon passage through the slot 32 serves to fasten the bumper rail 14 in place.

Referring now to FIG. 6, the portable computer 10 is shown to include a front wall 60, a back wall 62, a left sidewall 64, and a right sidewall 66, all interconnected by corners 68. The front wall further includes the latches 26. An embodiment of the bumper rail 14 is shown to have three sections. A first section 70 fits the contours of the left sidewall 64 and extends around the corners 68 to the back wall 62 and the front wall 60. A second section 72 fits the contours of the right sidewall 66 and extends around the corners 68 to the back wall 62 and the front wall 60. A third section 74 fits between the latches 26 on the front wall 60. In the preferred embodiment, the third section 74 and the portions of the first and second sections 70 and 72 which extend arount the corners 68 to the front wall 60 have a greater width than the remainder of the first and second sections 70 and 72 in order to protect the latches 26 as previously described.

Figure 7:
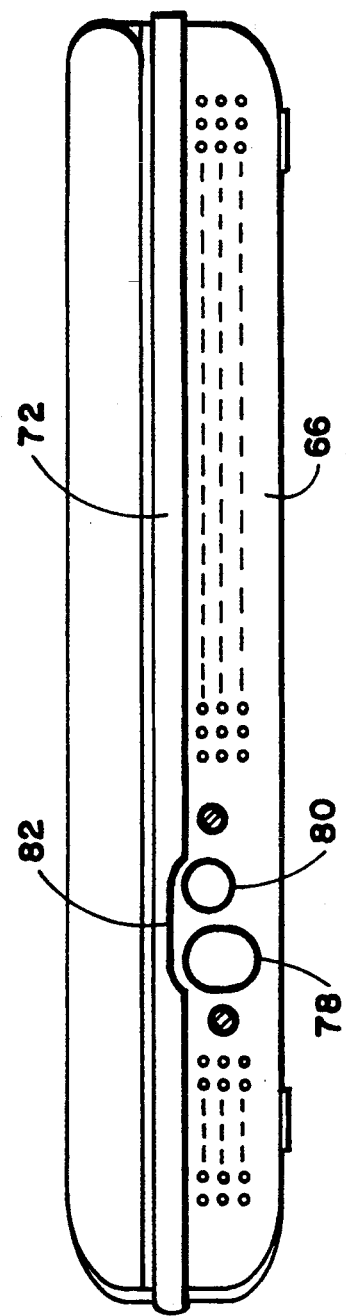
FIG. 7 is an elevated view of the right sidewall of the portable computer showing an indentation in the bumper rail to accomodate connectors.

The first and second bumper sections 70 and 72 may be manufactured as the same piece and thus operate interchangeably, or may be of different shapes to support different features of the computer 10. For example, referring to FIG. 7, there is shown the right side wall 66 of the computer 10 including a power switch 78 and keyboard jack 80. The second section 72 of the bumper rail 14 is shown to include an indentation 82 to accomodate the shape of the power switch 78 and keyboard jack 80.

The bumper rail 14 is preferrably manufactured through a molding process using a soft shock-absorbing rubber material, and may alternatively be manufactured of a sufficiently shock-absorbing plastic material. Using such materials it is easy to manufacture the bumper rail 14 in different colors to lend ergonomic advantages to the computer 10; for instance, the bumper rail 14 could be manufactured in grey for monochrome computers and in a bright color for color computers. Color computers would then be easily distinguished from monochrome computers by glancing at the computer enclosure.

It is apparent that, within the scope of the invention, modifications and different arrangements may be made other than as herein disclosed. The present disclosure is merely illustrative, the invention comprehending all variations thereof.

What is claimed is:

1. A portable computer enclosure comprising:
   a front wall;
   latches extending from the front wall for opening and closing the computer enclosure; and
   a bumper rail on the front wall, the bumper rail extending from the front wall to a distance greater than or equal to the distance to which the latches extend, the bumper rail protecting the latches from being accidentally released.

2. The portable computer enclosure of claim 1, wherein the bumper rail extends approximately the same distance to which the latches extend.

3. A portable computer enclosure comprising:
   a sidewall comprising a plurality of spaced apart slots;
   a bumper rail comprising a plurality of fastening protrusions extending from a surface of the rail and spaced apart for fastening cooperation with the slots, the fastening protrusions comprising a first lengthwise section of a dimension smaller than the width of a slot for extension through the slot and a second lengthwise section spaced from the surface of the rail and being of a dimension larger than the width of a slot for fastening the rail to the sidewall when the protrusion is in rail fastening position in the slot, the bumper rail being effective to provide bump protection to the sidewall.

4. The portable computer of claim 3 wherein the fastening protrusions are T-shaped, having a stem and a crossbar the stem of the T being for extension through the slot and the crossbar of the T being for fastening the rail to the sidewall.

5. The portable computer of claim 3 wherein the fastening protrusions are arrow-shaped, the stem of the arrow being for extension through the slot and of the head of the arrow being for fastening the rail to the sidewall.

6. A portable computer enclosure comprising:
   a front wall, a back wall, a left sidewall, and a right sidewall all interconnected by corners, the front wall further comprising latches extending from the front wall for opening and closing the computer enclosure; and
   a bumper rail comprising a first section fitting the left sidewall and extending around the corners to the back wall and the front wall, a second section fitting the right sidewall and extending around the corners to the back wall and the front wall, and a third section fitting between the latches, the third section extending from the front wall to a distance greater than or equal to the distance to which the latches extend.

7. The portable computer enclosure of claim 6, wherein the first section of the bumper rail is molded in the same shape as the second section.

8. The portable computer enclosure of claim 6, wherein the sidewall further comprises a plurality of spaced apart slots and the bumper rail further comprises a plurality of fastening protrusions extending from a surface of the rail and spaced apart for fastening cooperation with the slots, the fastening protrusions comprising a first lengthwise section of a dimension smaller than the width of a slot for extension through the slot and a second lengthwise section spaced from the surface of the rail, the second lengthwise section being of a dimension larger than the width of a slot for fastening the rail to the sidewall when the protrusion is in rail fastening position in the slot.

9. The portable computer enclosure of claim 8 wherein the fastening protrusions are T-shaped, having a stem and a crossbar the stem of the T being for extension through the slot and the crossbar of the T being for fastening the rail to the sidewall.

10. The portable computer enclosure of claim 8 wherein the fastening protrusions are arrow-shaped, having a stem and a head the stem of the arrow being for extension through the slot and the head of the arrow being for fastening the rail to the sidewall.

11. The portable computer enclosure of claim 6 wherein the bumper rail comprises a shock absorbent molded rubber material.

12. The portable computer enclosure of claim 6 wherein the third section of the bumper rail extends approximately the same distance from the front wall to which the latches extend.

13. A portable computer enclosure comprising:
   a plurality of sidewalls all interconnected by corners, one sidewall further comprising a latch extending from the one sidewall for opening and closing the computer enclosure; and
   a bumper rail fitting each sidewall and extending around the corners to the other sidewalls, the bumper rail being positioned so that ends of the bumper rail are adjacent to each side of the latch, the bumper rail extending from the sidewalls to a distance greater than or equal to the distance to which the latch extends from the one sidewall.

* * * * *